United States Patent [19]

Arnold

[11] Patent Number: 4,501,964

[45] Date of Patent: Feb. 26, 1985

[54] BOREHOLE COMPENSATED OXYGEN ACTIVATION NUCLEAR WELL LOGGING

[75] Inventor: Dan M. Arnold, Houston, Tex.

[73] Assignee: Texaco Inc., White Plains, N.Y.

[21] Appl. No.: 289,664

[22] Filed: Aug. 3, 1981

[51] Int. Cl.$^3$ .............................................. G01V 5/10
[52] U.S. Cl. .................................. 250/270; 250/266; 250/390
[58] Field of Search ............... 250/266, 270, 269, 262, 250/265, 390–392

[56] References Cited

U.S. PATENT DOCUMENTS

| 3,465,151 | 9/1969 | Youmans | 250/270 |
| 3,710,112 | 1/1973 | Caldwell et al. | 250/270 |
| 4,233,508 | 11/1980 | Arnold | 250/266 |

Primary Examiner—Alfred E. Smith
Assistant Examiner—Carolyn E. Fields

Attorney, Agent, or Firm—Jack H. Park; Ronald G. Gillespie

[57] ABSTRACT

Formations adjacent a well borehole are activated with neutrons from a pulsed neutron source in a sonde at an energy level, such as 14 MeV, to energize oxygen present in the formation and borehole, giving rise to gamma radiation from $O^{16}(n,p)N^{16}$ reaction. Gamma radiation in the energy windows 3.25–4.00 MeV and 4.75–7.20 MeV is detected in a time gated detector and counted. Count rate contributions from the borehole and from the formation are differentiated on the basis of radial distance from the center of the sonde. In this manner, compensation for adverse effects of borehole oxygen activation on formation oxygen activation measurements of interest is achieved. Further, the neutron output intensity of the pulse neutron source may also be measured.

21 Claims, 7 Drawing Figures

BOREHOLE COMPENSATED OXYGEN ACTIVATION NUCLEAR WELL LOGGING

BACKGROUND OF THE INVENTION

1. Field of Invention

The present invention relates to oxygen activation nuclear well logging.

2. Description of the Prior Art

Prior U.S. Pat. No. 3,465,151 discloses a technique for oxygen activation nuclear well logging of formations adjacent a well borehole. Although it is mentioned and recognized in this prior U.S. patent that the presence of water and, thus, oxygen in the well borehole will tend to obscure radiation of interest from the formations, no effort is made to compensate for this presence. In fact, it is indicated that the methods of this prior U.S. patent have greatest utility in empty or oil filled boreholes. However, typical boreholes contain some measure of water. Another factor known to be often present but not compensated for was variations in the flux intensity of the neutrons on the oxygen activation readings.

SUMMARY OF INVENTION

Briefly, the present invention provides a new and improved method of nuclear well logging to determine oxygen concentration of a well formation adjacent a well borehole.

The present invention permits determination of the oxygen concentration $M_o$ of earth formations while also compensating for the effects of oxygen present in the well borehole. A knowledge of $M_o$ can be used to determine if the formation fluids adjacent the well borehole contain hydrocarbons. The oxygen content by weight of most water saturated formations is generally substantially constant, from forty-nine to fifty-five percent, and is essentially independent of lithology and porosity of the formation. Where, on the other hand, the formation is porous and is saturated with hydrocarbons, the oxygen content of the formation is reduced since water contains oxygen and hydrocarbons do not contain oxygen. A knowledge of the oxygen content of an earth formation can thus be used to delineate hydrocarbon bearing formations from water bearing formations.

During logging according to the present invention, compensation for the effects of oxygen present in the well borehole is achieved. The formation and borehole constituents are bombarded with high energy neutrons from a neutron source in a sonde in the borehole. Gamma radiation resulting from the $O^{16}(n,p)N^{16}$ oxygen activation reaction from bombarded oxygen in the formation and borehole is detected with a gamma ray detector spaced from the neutron source in the sonde. A measure of detected gamma radiation is then obtained in at least two gamma ray energy count windows. A borehole oxygen ratio of gamma radiation in the gamma ray energy windows from bombarded oxygen in the borehole is obtained, as well as a formation oxygen ratio of gamma radiation in the gamma ray energy windows from bombarded oxygen from the formation in the absence of bombarded borehole oxygen in the vicinity of the detector. From the borehole oxygen ratio and the formation oxygen ratio, a measure of the oxygen concentration in the formation may be obtained.

If desired, the techniques of the present invention may be used to measure relative changes in oxygen concentration at various borehole depths and adjacent various formations rather than obtaining a quantitative measure of oxygen concentration at the various depths and formations. Also, the present invention may be performed with plural gamma ray detectors rather than a single gamma ray detector with plural gamma ray energy count windows. Additionally, the present invention may be used to obtain a measure of neutron output intensity from the neutron source during bombardment of the formation and borehole constituents.

DESCRIPTION OF PREFERRED EMBODIMENT

Figure 1:
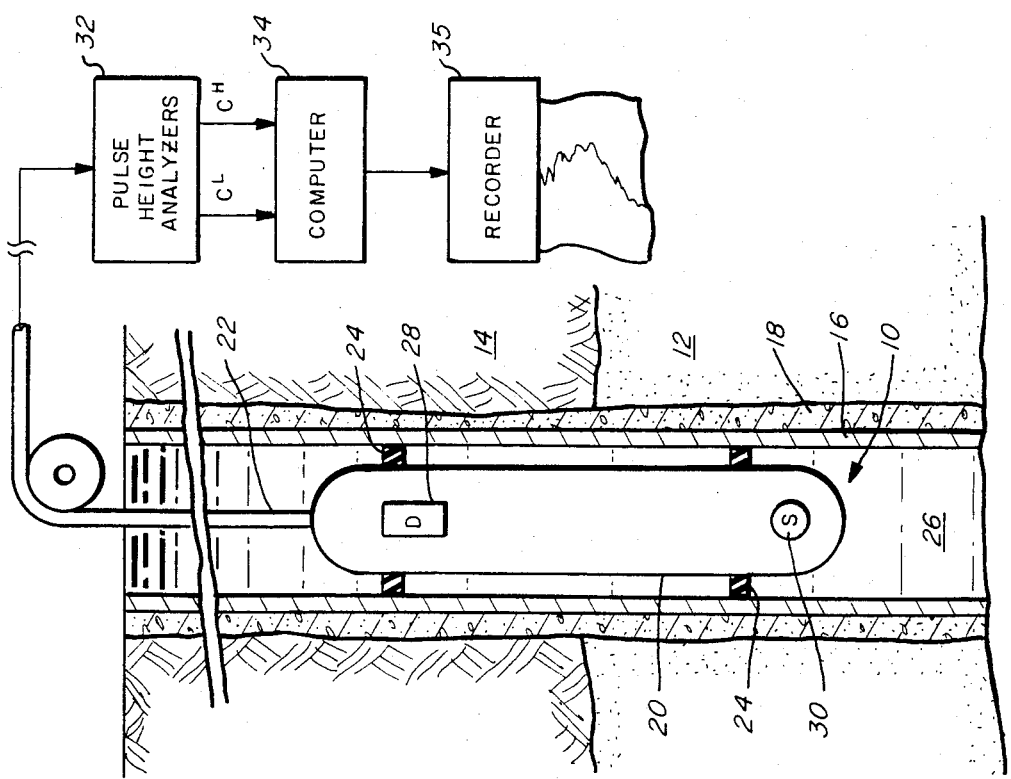
FIG. 1 is a schematic diagram of a well logging system with portions thereof in a cased well bore according to the present invention.

Referring to FIG. 1, a well logging system in accordance with the present invention is shown in a well borehole 10 adjacent formations 12 and 14. As is typical, the borehole 10 has a casing 16 held in place by cement 18. A downhole sonde 20 is suspended in the well borehole 10 by an armored well logging cable 22 and is centralized by centralizers 24 with respect to the interior of the well casing 16. The cased borehole 10 is filled with a well borehole fluid 26 which typically contains as a constituent thereof water and accordingly oxygen.

The downhole sonde 20 is provided with a gamma ray detector 28 and a high energy neutron source 30. Detector 28 is mounted above the source 30 in the sonde 20, and thus logging would be performed while the sonde 20 is being lowered into the borehole 10 from the surface. It should be understood, however, that the position of the detector 28 and the source 30 in the sonde 20 may be reversed and logging performed as the sonde 20 is being raised in the borehole 10 toward the surface.

The detector 28 preferably takes the form of thallium-activated sodium iodide crystal detector provided with suitable shielding between the detector 28 and the source 30. The detector 28 may be, for example, of the type described in U.S. Pat. No. 4,032,780, which is incorporated herein by reference for all purposes. Detector 28 is provided with a power supply, either in the sonde 20 or at the surface. Sonde 20 also contains suitable electronic circuitry for detector 28 of the type disclosed in such prior United States patent for transmission of electrical pulses in response to detected gamma radiation over the cable 22 to a pulse height analyzer 32.

The source 30 is preferably of the deuterium-tritium reaction accelerator type and generates a relatively high intensity of neutrons having an energy sufficient to induce the $O^{16}(n,p)N^{16}$ reaction, such as approximately fourteen MeV. Preferably, the source 30 is pulsed and the detector 28 is time gated in the manner of U.S. Pat. No. 4,032,780 to minimize adverse effects of thermal neutron capture gamma radiation on the gamma radiation detected by detector 28.

When the source 30 is activated, the formation 12 and the borehole constituent fluid 26 are bombarded with high energy neutrons. The neutrons emitted by the source 30 interact with oxygen nuclei in water present in fluid in the formation 12 and the borehole constituent fluid 26, producing the radioactive isotope $N^{16}$ through the $O^{16}(n,p)N^{16}$ reaction. Radioactive isotope $N^{16}$ decays with a half-life of 7.3 seconds, emitting 7.12 and 6.13 MeV gamma radiation. The intensity of this gamma radiation is detected by the detector 28 and is transmitted through electronics in the sonde 20 over the cable 22 to pulse height analyzer 32 at the surface.

The intensity of the gamma radiation detected by the detector 28 and counted in the pulse height analyzer 32 is affected not only by the oxygen content of the formation 12, which is the quantity of interest during logging, but also by the oxygen in the borehole constituent fluid 26 whenever the fluid 26 contains water. Thus, the neutron source 30 induces $N^{16}$ activity within water in the borehole fluid 26. As the sonde 20 moves through the borehole 10 with the source 30 preceding the detector 28, the activated borehole water is forced passed the detector 28 contributing to the total recorded $N^{16}$ activity.

The present invention permits determination, such as in a computer 34, of the oxygen concentration $M_o$ of earth formations while also compensating for the effects of oxygen present in the well borehole. The values $M_o$ determined in computer 34, as well as other results determined in the computer 34 in a manner set forth below, may be plotted as a function of borehole depth with a recorder 35.

A knowledge of $M_o$ can be used to determine if the formation fluids adjacent the well borehole 10 contain hydrocarbons. The oxygen content by weight of most water saturated formations is generally substantially constant, from forty-nine to fifty-five percent, and is essentially independent of lithology and porosity of the formation. Where, on the other hand, the formation is porous and is saturated with hydrocarbons, the oxygen content of the formation is reduced since water contains oxygen and hydrocarbons do not contain oxygen. A knowledge of the oxygen content of an earth formation can thus be used to delineate hydrocarbon bearing formations from water bearing formations.

Figure 2:
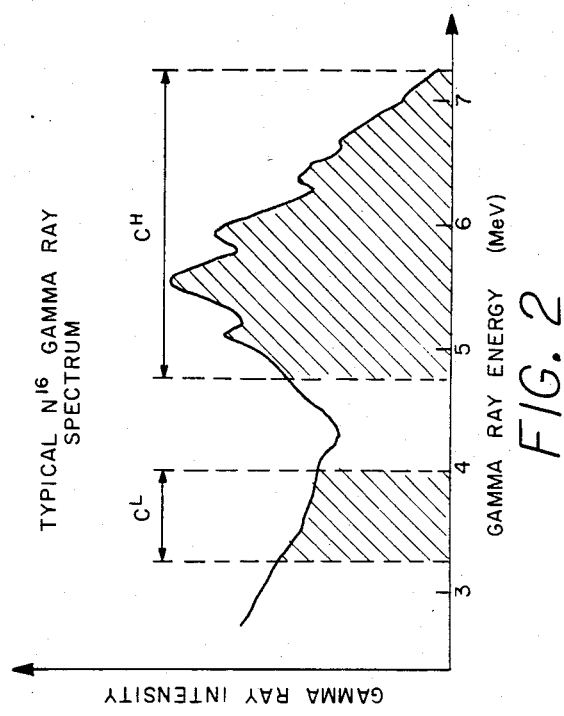
FIG. 2 is a graphical presentation of a typical $N^{16}$ gamma ray energy spectrum, having two energy count windows.

The pulse height analyzer 32 may be either a multichannel analyzer or plural single channel analyzers. Pulse height analyzer 32 accumulates gamma radiation counting rates $C^L$ and $C^H$ falling within two suitable energy windows, such as the energy windows extending from about 3.25 MeV to 4.00 MeV and from about 4.75 MeV to 7.20 MeV, respectively (FIG. 2).

The measured counting rates $C^L$ and $C^H$ in pulse height analyzer 32 represent the sum of contributions from oxygen activation in the borehole fluid 26 and formation 12, as expressed in equations (1) and (2) below, where the subscripts B and F represent the borehole and formation components, respectively.

$$C^L = C_B^L + C_F^L \quad (1)$$

$$C^H = C_B^H + C_F^H \quad (2)$$

Two constants $K_F$ and $K_B$, the formation oxygen ratio and the borehole oxygen ratio, respectively, developed in a manner set forth below, are defined as follows:

$$K_F = C_F^L/C_F^H \quad (3)$$

$$K_B = C_B^L/C_B^H \quad (4)$$

Substituting equations (3) and (4) into (1) yields $$C^L = K_B C_B^H + K_F C_F^H \quad (5)$$

Solving equations (2) and (5) simultaneously yields $$C_F^H = (C^L - K_B C^H)/(K_F - K_B) \quad (6)$$

$$C_B^H = (C^L - K_F C^H)/(K_B - K_F) \quad (7)$$

$C^L$ and $C^H$ are, of course, measured quantities. $C_F^H$ and $C_B^H$ can be determined from equations (6) and (7) once $K_B$ and $K_F$ can be determined.

DETERMINATION OF $K_B$

Figure 3:
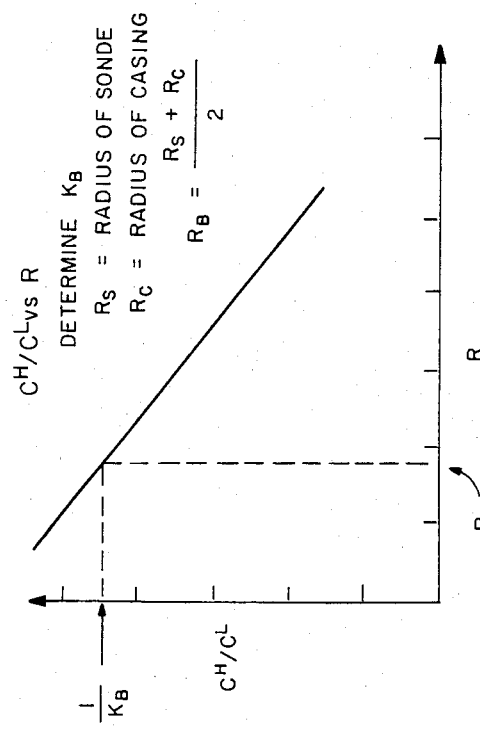
FIG. 3 is a graphical representation of gamma ray energy count ratios as a function of distance of a gamma ray source from a detector.

FIG. 3 shows a curve relating to $C^H/C^L$ to R, the radial distance from the center of the sonde 20 to a center of origination of distribution of radioactive $N^{16}$ nuclei. The general development of a curve of this type is discussed in detail in U.S. Pat. No. 4,032,778, which is incorporated herein by reference for all purposes.

Basically, a gamma ray spectral degradation technique is performed in test pit formations using a suitable source of suitable energy, such as 6.13 MeV, at various radial distances R from the detector 28 and a calibration measure count rate ratio $C^H/C^L$ is measured. A graph of the form of FIG. 3 is then formed for the count ratios as a function of various distances R.

Recalling from equation (4) above that $K_B$ is equal to the ratio of the borehole components $C_B^L/C_B^H$, it is apparent that $K_B^{-1}$ can be obtained from the curve of FIG. 3. Specifically, $R_B$, the radial distance from the center of the sonde 20 to the center of the $N^{16}$ activity in the borehole 26, is $$R_B = (\text{RADIUS OF SONDE} + \text{RADIUS OF CASING})/2 \quad (8)$$

Since the radii are known, $R_B$ and thus $K_B$ can be determined using the above equation (8) and the curve of FIG. 3.

Figure 4A:
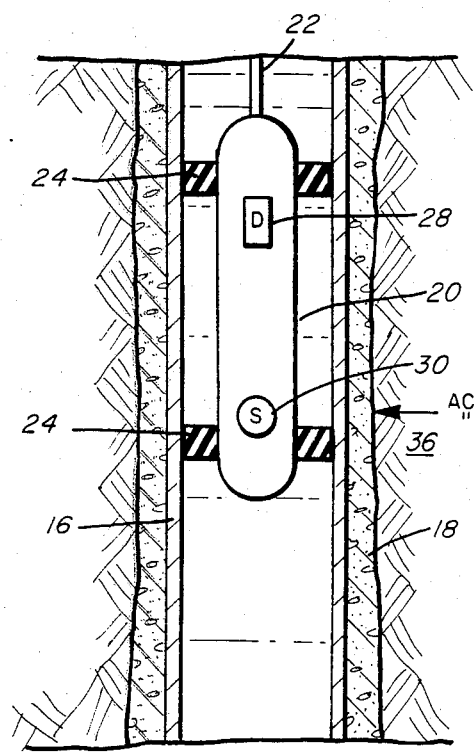
FIG. 4A and 4B are schematic diagrams of portions of the system of FIG. 1 in operation according to the present invention.
Figure 4B:
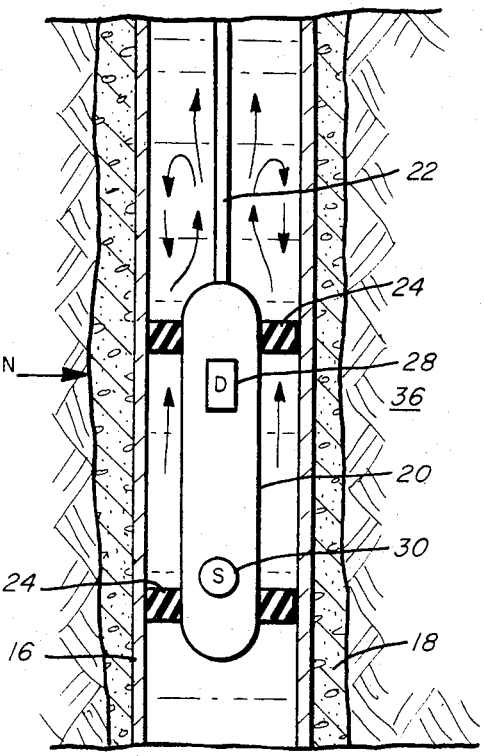

DETERMINATION OF $K_F$ $K_F$ for a given borehole condition can be measured by using an activation-count technique. The sonde 20 is positioned such that the source 30 is opposite a formation, such as 36 (FIG. 4A), containing at least some water and whose porosity is somewhat similar to that of the formation to be logged. The formation is then activated for approximately thirty seconds to allow the $N^{16}$ activity to approach saturation. Next the sonde 20 is moved such that the detector 28 is positioned opposite the original activation spot (FIG. 4B) and the quantities $C^L$ and $C^H$ are measured. When the sonde 20 is moved, the $N^{16}$ activity induced within the borehole water 26 is displaced away from the general area of the detector 28 which is now opposite the activation spot, as indicated schematically by the arrows above the sonde 20. Thus, the recorded counting rate $C^L$ and $C^H$ contain substantially no borehole component. Mathematically, therefore, $$C_B{}^L = C_B{}^H = 0 \tag{9}$$

From equations (1) and (2), we have $$C^L/C^H = (C_B{}^L + C_F{}^L)/(C_B{}^H + C_F{}^H) \tag{10}$$

Substituting equation (9) into equation (10) yields $$C^L/C^H = C_F{}^L/C_F{}^H \equiv K_F \tag{11}$$

$K_F$ is therefore, determined for a given borehole condition through equation (11).

Having now determined the constants $K_B$ and $K_F$, equations (6) and (7) can now be used in the computer 34 to compute $C_F{}^H$ and $C_B{}^H$, respectively, from known or measured quantities. $C_F{}^H$, the counting rate from $N^{16}$ from the formation only in the energy range 4.75–7.2 MeV, is related to $M_o$, the concentration of oxygen in the formation, through the equation $$M_o = \phi_N Q C_F{}^H \tag{12}$$

where $\phi_N$ = the 14 MeV neutron output of the neutron generator

Q = a constant for a given sonde geometry, detector efficiency, and logging speed $M_o$, the quantity of interest, can be determined from the computed quantity $C_F{}^H$ if $\phi_N$ remains constant. In practice, however, $\phi_N$ can vary and should be monitored.

If the borehole conditions remain constant, (i.e. the oxygen content of the borehole fluid and the casing size remain constant), $\phi_N$ is related to $C_B{}^H$ through the equation $$\phi_N = P C_B{}^H \tag{13}$$

where P is a constant for a given sonde geometry, detector efficiency, and logging speed. Substituting equation (12) and (11) yields $$M_o = H C_F{}^H C_B{}^H \tag{14}$$

where $H = P \cdot Q$ is again a calibration constant for a given sonde geometry, detector efficiency, and logging speed.

Equation (14) relates $M_o$, the quantity of interest, to $C_F{}^H$ and $C_B{}^H$ which can be computed in the computer 34 in the foregoing manner from known or measured quantities. Computer 34 may also determine $\phi_N$, the neutron output intensity, as well. In field operations, it sometimes suffices to measure relative changes in $M_o$ to delineate hydrocarbon and water bearing formations. It is, therefore, in these situations not necessary to know $M_o$ explicitly. If, however, quantitative values of $M_o$ are desired, $M_o$ can be obtained by calibrating the sonde 20 in test formations containing known values of $M_o$ and with known borehole conditions. In this procedure, $C_F{}^H$ and $C_B{}^H$ are measured, and since $M_o$ is known, Equation (14) can be solved for the calibration constant H in computer 34.

Figure 6:
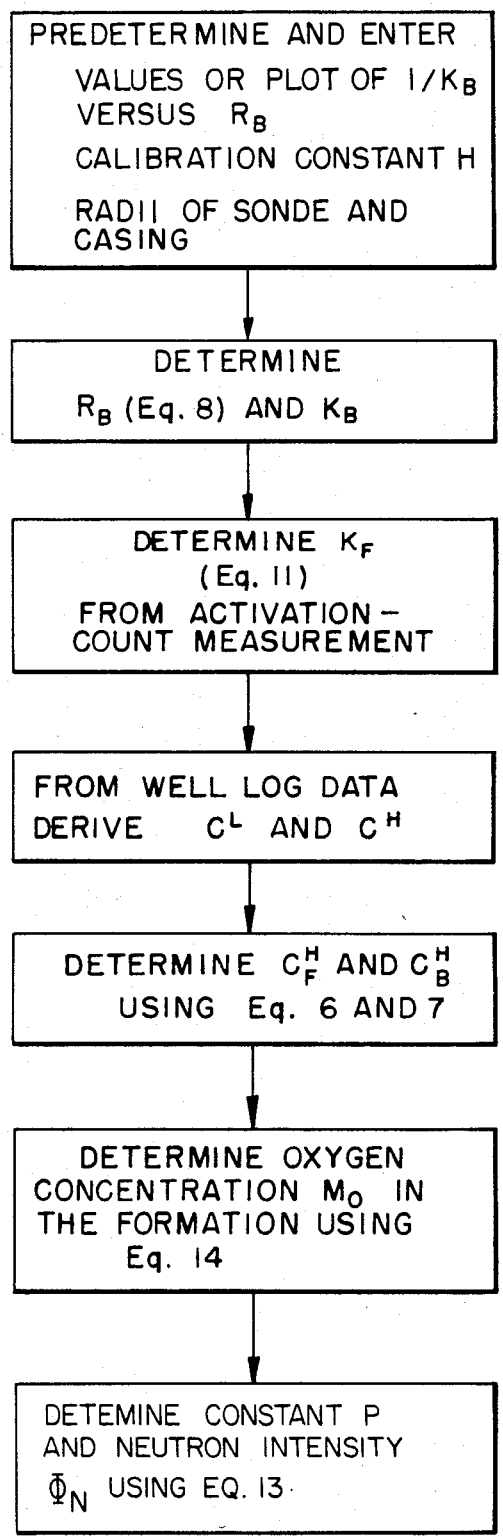
FIG. 6 is a simplified flow chart for the utilization of the computer shown in FIG. 1.

FIG. 6 shows a simplified flow diagram of one way of practicing the present invention. It is obvious to one skilled in the art that the neutron density $\Phi_n$ and the oxygen concentration $M_o$ may be determined independently of each other and that FIG. 6 does not require the determination of the oxygen concentration $M_o$ prior to a determination of the neutron density.

Figure 5:
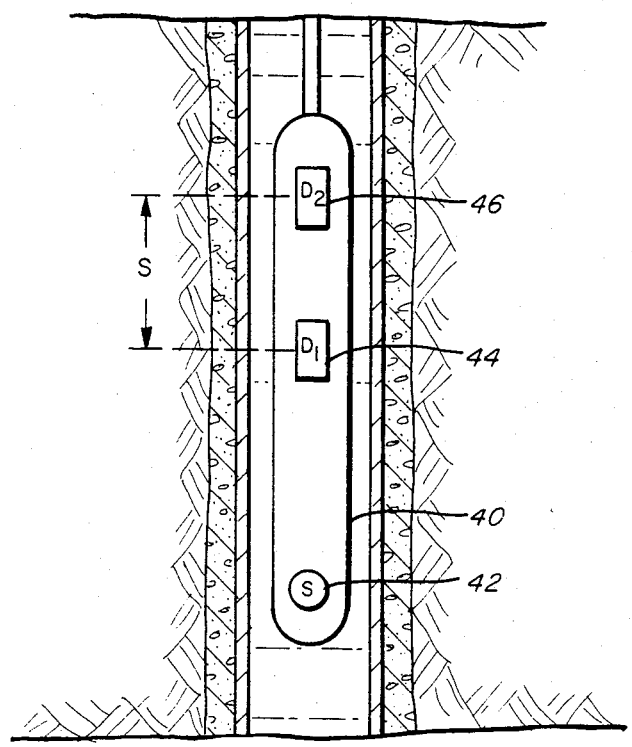
FIG. 5 is a schematic diagram of an alternative well logging system according to the present invention.

The adverse effects of the activated borehole fluid can also be eliminated by using a dual gamma ray detector oxygen activation logging sonde 40 (FIG. 5). A neutron source 42 is again pulsed in the manner set forth above and gamma ray detectors 44 and 46 are time gated to minimize contributions from thermal capture gamma radiation. Detectors 44 and 46 are spaced from source 42, and from each other, a distance S. The counting rates recorded in a single energy window extending, for example, from 3.25 to 7.2 MeV in detectors 44 and 46 can be expressed as $$C_1 = C_{1,B} + C_{1,F} \tag{15}$$

$$C_2 = C_{2,B} + C_{2,F} \tag{16}$$

where the subscripts 1 and 2 designate the detector subscript for detectors 44 and 46, respectively, in the drawings and F and B designate formation and borehole components, respectively. However, $$C_{2,B} = C_{1,B} e^{-\lambda S/f} \tag{17}$$

where $\lambda$ is the decay constant of $N^{16}$ and S is the spacing between the two detectors, and $$f = v A_B / (A_B - A_{20}) \tag{18}$$

where v is the logging speed, $A_{20}$ is the cross section area of the sonde 20, and $A_B$ is the cross sectional area of the borehole. Also:

$$C_{2,F} = C_{1,F} e^{-\lambda S/v} \tag{19}$$

Substituting equations (19) and (17) into equation (16) yields $$C_2 = C_{1,B} e^{-\lambda S/f} + C_{1,F} e^{-\lambda S/v} \tag{20}$$

Solving equations (20) and (15) simultaneously yields $$C_{1,F} = \frac{C_2 - C_1 e^{-\lambda S/f}}{e^{-\lambda S/v} - e^{-\lambda S/f}} \tag{21}$$

$$C_{1,B} = \frac{C_1 e^{-\lambda S/v} - C_2}{e^{-\lambda S/v} - e^{-\lambda S/f}} \tag{22}$$

All of the terms on the right hand side of equations (21) and (22) are either known ($\lambda$,v,S), are measured ($C_1$, $C_2$), or are computed from known quantities (f). These equations can, therefore, be solved in computer 34 to determine $C_{1,F}$ and $C_{1,B}$ which are in turn, substituted into equation (14) to determine $M_o$, the concentration of oxygen within the formation.

The foregoing disclosure and description of the invention are illustrative and explanatory thereof and various changes in the size, shape and materials as well as the details of the illustrated construction may be made without departing from the spirit of the invention.

I claim:

1. A method of nuclear well logging to determine oxygen concentration of a formation adjacent a well borehole while compensating for the effects of oxygen present in the well borehole, comprising the steps of:
   (a) bombarding the formation and borehole constituents with high energy neutrons from a neutron source in a sonde;
   (b) detecting with a gamma ray detector spaced from the source in the sonde gamma radiation resulting from the $O^{16}(n,p)N^{16}$ reaction from bombarded oxygen in the formation and borehole;

(c) obtaining a measure of detected gamma radiation in at least two gamma ray energy count windows;

(d) obtaining a borehole oxygen ratio of the gamma radiation in the gamma ray energy windows from bombarded oxygen in the borehole;

(e) obtaining a formation oxygen ratio of the gamma radiation in the gamma ray energy windows from the formation in the absence of bombarded borehole oxygen in the vicinity of the detector; and (f) obtaining from the borehole oxygen ratio and the formation oxygen ratio a measure of the oxygen concentration in the formation.

2. The method of claim 1, wherein said step of obtaining a measure of the oxygen concentration includes:
obtaining a measure of the formation oxygen activation gamma radiation in one of the gamma ray energy windows.

3. The method of claim 2, wherein said step of obtaining a measure of the formation oxygen activation gamma radiation comprises obtaining a measure of the gamma radiation in the higher energy gamma ray energy window, wherein the higher energy gamma ray energy window is from about 4.75 MeV to about 7.20 MeV.

4. The method of claim 1, wherein said step of obtaining a measure of the oxygen concentration includes:
obtaining a measure of the formation oxygen activation gamma radiation and the borehole oxygen activation gamma radiation in one of the gamma ray energy windows.

5. The method of claim 4, wherein said step of obtaining a measure of the formation oxygen activation gamma radiation and the borehole oxygen activation gamma radiation comprises obtaining a measure of the gamma radiation in the higher energy gamma ray energy window, wherein the higher energy gamma ray energy window is from about 4.75 MeV to about 7.20 MeV.

6. The method of claim 1, further including the step of:

(a) obtaining a measure of the formation oxygen activation gamma radiation in one of the gamma ray energy windows; and (b) obtaining from the borehole oxygen ratio and the formation oxygen ratio a measure of the neutron output during said step of bombarding.

7. The method of claim 1, further including the step of:
forming a record of the measure of oxygen concentration in the formation as a function of borehole depth.

8. The method of claim 1, wherein said step of obtaining a formation oxygen ratio comprises the steps of:

(a) bombarding a formation of interest and borehole fluids at an activation spot adjacent the neutron source with high energy neutrons;

(b) moving the sonde so that the detector is located at the activation spot;

(c) displacing the bombarded borehole fluids during said step of moving the sonde so that essentially only formation gamma radiation is present at the activation spot;

(d) detecting with the detector the formation gamma radiation in the gamma ray energy windows; and (e) forming a ratio of the detected gamma radiation in the gamma ray energy windows.

9. The method of claim 1, wherein said step of obtaining a borehole oxygen ratio comprises the steps of:

(a) forming a calibration measure of count rate ratios as a function of borehole radius in a test facility;

(b) obtaining an average borehole radius reading comprised of the average of the sum of the radius of the sonde and the radius of the borehole casing; and (c) obtaining from the calibration measure and the average borehole radius the borehole oxygen ratio.

10. A method of measuring neutron output intensity from a neutron source in a sonde which bombards formation and well borehole constituents with neutrons during well logging, comprising the steps of:

(a) bombarding the formation and borehole constituents with high energy neutrons from a neutron source in a sonde;

(b) detecting with a gamma ray detector spaced from the source in the sonde gamma radiation resulting from the $O^{16}(n,p)N^{16}$ reaction from bombarded oxygen in the formation and borehole;

(c) obtaining a measure of detected gamma radiation in at least two gamma ray energy count windows;

(d) obtaining a borehole oxygen ratio of the gamma radiation in the gamma ray energy windows from bombarded oxygen in the borehole;

(e) obtaining a formation oxygen ratio of the gamma radiation in the gamma ray energy windows from the formation in the absence of bombarded borehole oxygen in the vicinity of the detector; and (f) obtaining from the borehole oxygen ratio and the formation oxygen ratio a measure of the neutron output intensity during said step of bombarding.

11. The method of claim 10, wherein said step of obtaining a measure of neutron output intensity includes:
obtaining a measure of the borehole oxygen activation gamma radiation in one of the gamma ray energy windows.

12. The method of claim 11, wherein said step of obtaining a measure of the borehole oxygen activation gamma radiation comprises obtaining a measure of the gamma radiation in the lower energy gamma ray energy window, wherein the lower energy gamma ray energy window is from about 3.25 MeV to about 4.00 MeV.

13. The method of nuclear well logging to determine oxygen concentration of a formation adjacent a well borehole while compensating for the effects of oxygen present in the well borehole, comprising the steps of:

(a) bombarding the formation and borehole constituents with high energy neutrons from a neutron source in a sonde;

(b) detecting with a gamma ray detector spaced from the source in the sonde gamma radiation resulting from the $O^{16}(n,p)N^{16}$ reaction from bombarded oxygen in the formation and borehole;

(c) obtaining a measure of detected gamma radiation in at least two gamma ray energy count windows;

(d) obtaining a borehole oxygen ratio of the gamma radiation in the gamma ray energy windows from bombarded oxygen in the borehole;

(e) obtaining a formation oxygen ratio of the gamma radiation in the gamma ray energy windows from the formation in the absence of bombarded borehole oxygen in the vicinity of the detector; and (f) obtaining from the borehole oxygen ratio and the formation oxygen ratio a measure of relative changes in the oxygen concentration in the formation.

14. The method of claim 13, wherein said step of obtaining a measure of relative changes in the oxygen concentration includes:
    obtaining a measure of the formation oxygen activation gamma radiation in one of the gamma ray energy windows.

15. The method of claim 14, wherein said step of obtaining a measure of the formation oxygen activation gamma radiation comprises obtaining a measure of the gamma radiation in the higher energy gamma ray energy window, wherein the higher energy gamma ray energy window is from about 4.75 MeV to about 7.20 MeV.

16. The method of claim 13, wherein said step of obtaining a measure of relative changes in the oxygen concentration includes:
    obtaining a measure of the formation oxygen activation gamma radiation and the borehole oxygen activation gamma radiation in one of the gamma ray energy windows.

17. The method of claim 16, wherein said step of obtaining a measure of the formation oxygen activation gamma radiation and the borehole oxygen activation gamma radiation comprises obtaining a measure of the gamma radiation in the higher energy gamma ray energy window, wherein the higher energy gamma ray energy window is from about 4.75 MeV to about 7.20 MeV.

18. The method of claim 13, further including the step of:
    (a) obtaining a measure of the formation oxygen activation gamma radiation in one of the gamma ray energy windows; and
    (b) obtaining from the borehole oxygen ratio and the formation oxygen ratio a measure of the neutron output during said step of bombarding.

19. The method of claim 13, further including the step of:
    forming a record of the measure of relative changes in oxygen concentration in the formation as a function of borehole depth.

20. The method of claim 13, wherein said step of obtaining a formation oxygen ratio comprises the steps of:
    (a) bombarding a formation of interest and borehole fluids at an activation spot adjacent the neutron source with high energy neutrons;
    (b) moving the sonde so that the detector is located at the activation spot;
    (c) displacing the bombarded borehole fluids during said step of moving the sonde so that essentially only formation gamma radiation is present at the activation spot;
    (d) detecting with the detector the formation gamma radiation in the gamma ray energy windows; and
    (e) forming a ratio of the detected gamma radiation in the gamma ray energy windows.

21. The method of claim 13, wherein said step of obtaining a borehole oxygen ratio comprises the steps of:
    (a) forming a calibration measure of count rate ratios as a function of borehole radius in a test facility;
    (b) obtaining an average borehole radius reading comprised of the average of the sum of the radius of the sonde and the radius of the borehole casing; and
    (c) obtaining from the calibration measure and the average borehole radius the borehole oxygen ratio.

* * * * *